(12) United States Patent
Hwang et al.

(10) Patent No.: US 10,816,719 B2
(45) Date of Patent: Oct. 27, 2020

(54) DISPLAY DEVICE

(71) Applicant: LG ELECTRONICS INC., Seoul (KR)

(72) Inventors: Woongjoon Hwang, Seoul (KR); Jeonghwan Hwang, Seoul (KR); Hyongil Kil, Seoul (KR); Minho Kim, Seoul (KR); Jinsin Park, Seoul (KR); Heumseok Baek, Seoul (KR); Yongmin Jung, Seoul (KR); Juyoung Joung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/636,893

(22) PCT Filed: Apr. 18, 2018

(86) PCT No.: PCT/KR2018/004512
§ 371 (c)(1),
(2) Date: Feb. 5, 2020

(87) PCT Pub. No.: WO2019/031684
PCT Pub. Date: Feb. 14, 2019

(65) Prior Publication Data
US 2020/0166695 A1     May 28, 2020

(30) Foreign Application Priority Data

Aug. 8, 2017 (KR) .................. 10-2017-0100371

(51) Int. Cl.
*F21V 8/00* (2006.01)

(52) U.S. Cl.
CPC .......... *G02B 6/0088* (2013.01); *G02B 6/0046* (2013.01); *G02B 6/0055* (2013.01)

(58) Field of Classification Search
CPC .. G02B 6/0088; G02B 6/0046; G02B 6/0055; G02F 1/1335
See application file for complete search history.

(56) References Cited

U.S. PATENT DOCUMENTS

2015/0378212 A1   12/2015  Jia et al.
2016/0330838 A1*  11/2016  Park ................. G02F 1/133608

FOREIGN PATENT DOCUMENTS

KR     20010016747      3/2001
KR     20110126577      11/2011
(Continued)

OTHER PUBLICATIONS

PCT International Application No. PCT/KR2018/004512, International Search Report dated Aug. 14, 2018, 3 pages.

*Primary Examiner* — Donald L Raleigh
(74) *Attorney, Agent, or Firm* — Lee, Hong, Degerman, Kang & Waimey

(57) ABSTRACT

A display device is disclosed. The display device of the present invention comprises: a display panel; a frame positioned at the back of the display panel; a main optical assembly positioned on the frame between the display panel and the frame; and a side optical assembly positioned on the frame between the display panel and the frame, and positioned adjacent to the main optical assembly, wherein the frame comprises: a bottom forming a lower surface; and a side support extending from the bottom toward one side of the display panel, wherein: the side support is closer to the display panel than the bottom; the main optical assembly is positioned on the bottom; and the side optical assembly can be positioned on the side support.

9 Claims, 17 Drawing Sheets

(56) References Cited

FOREIGN PATENT DOCUMENTS

| | | |
|---|---|---|
| KR | 20140142059 | 12/2014 |
| KR | 20160131549 | 11/2016 |

* cited by examiner

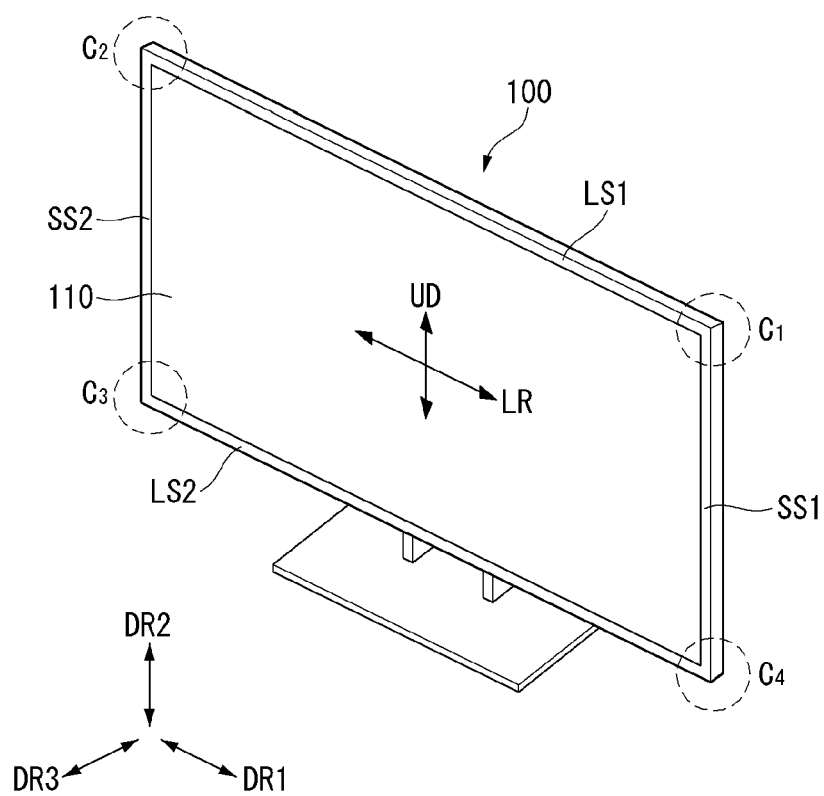
[Figure 1]

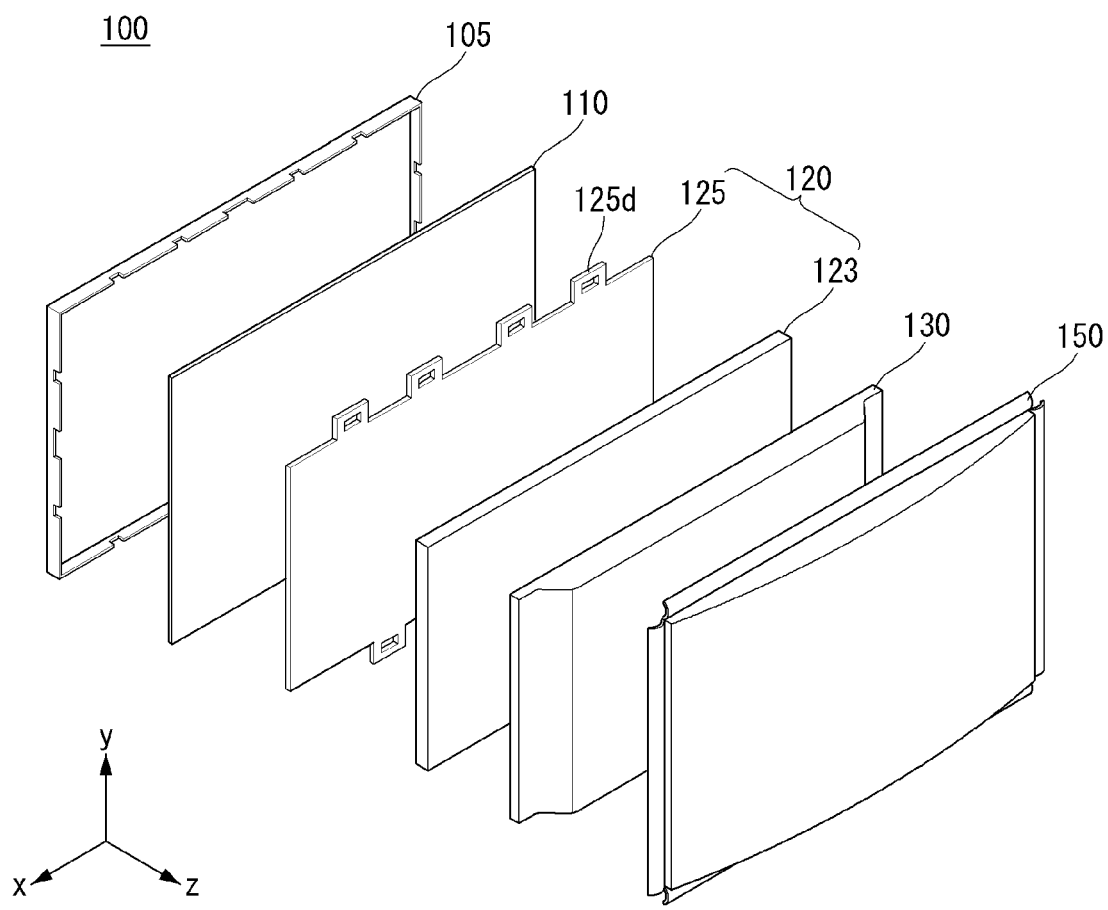
[Figure 2]

[Figure 3]
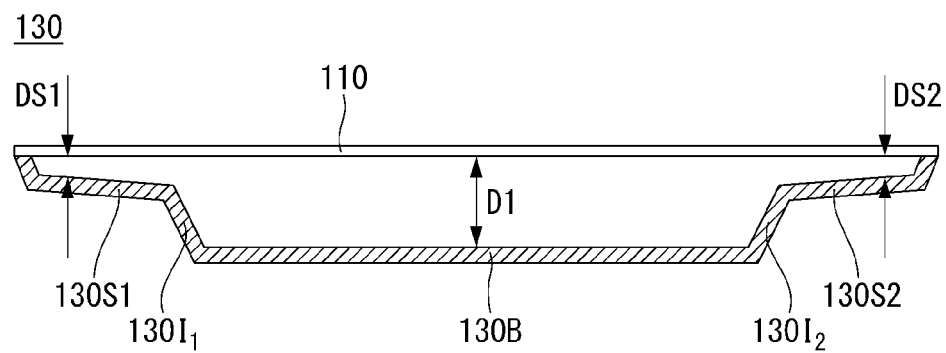

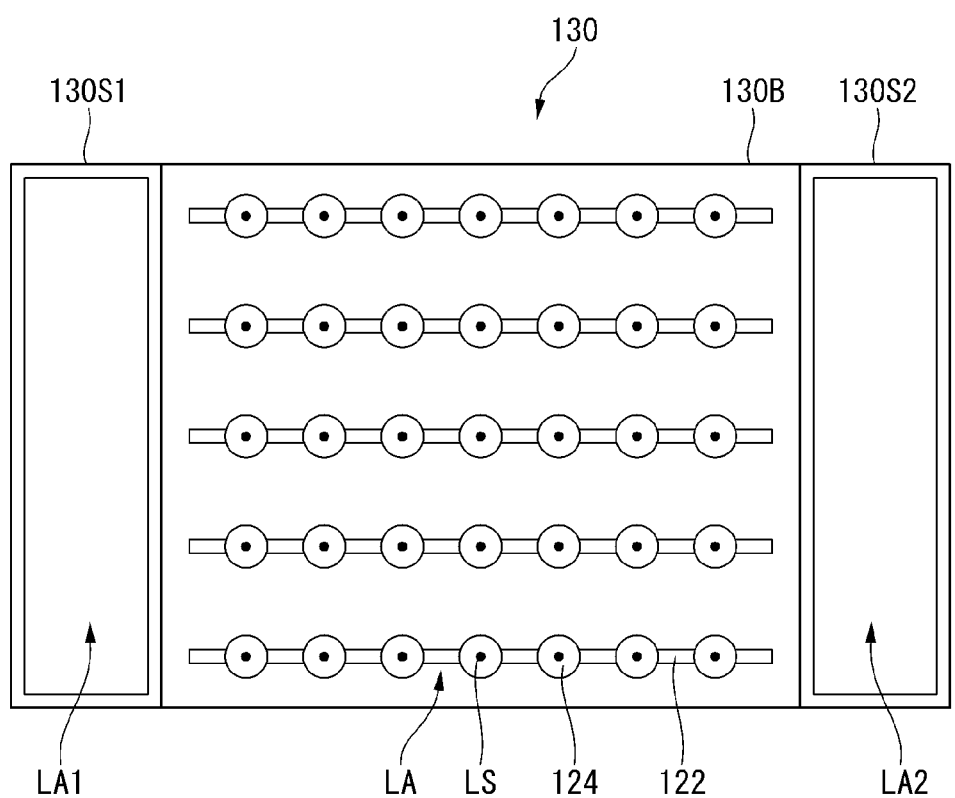
[Figure 4]

[Figure 5]
LA1
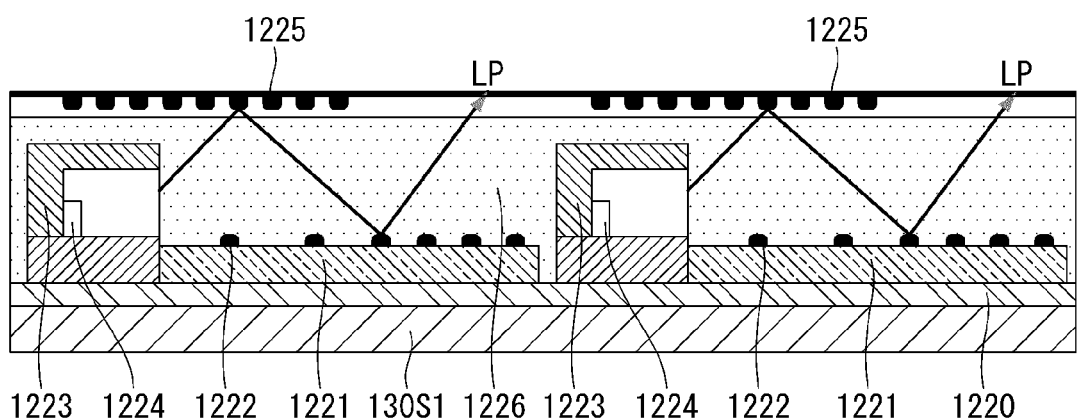

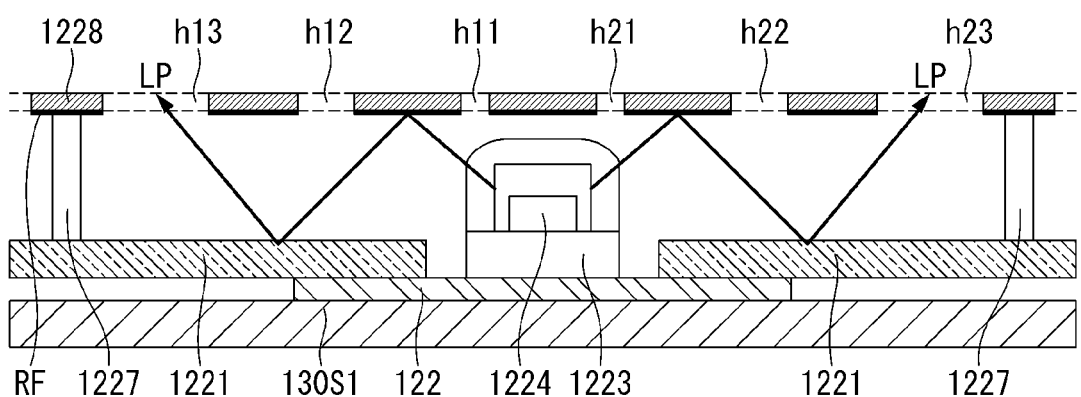
[Figure 6]

[Figure 7]
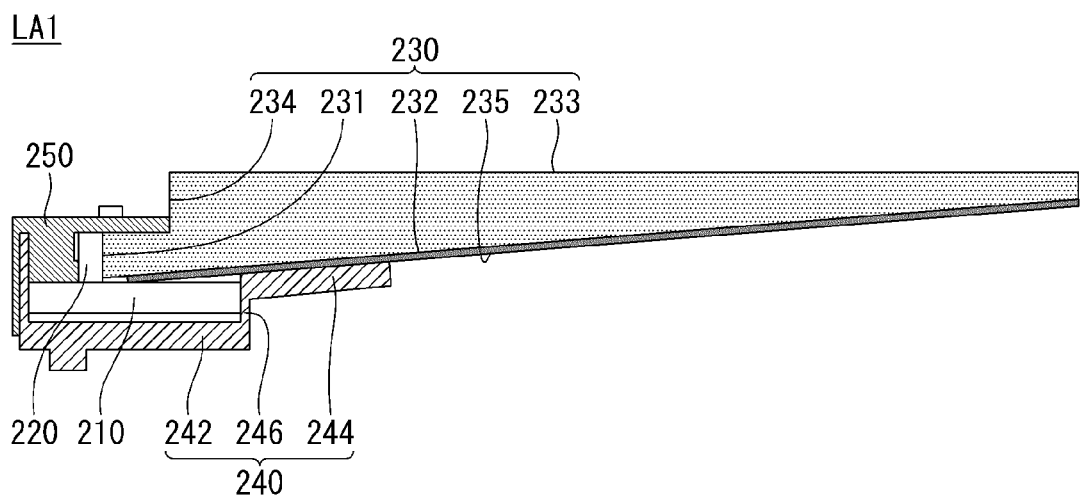

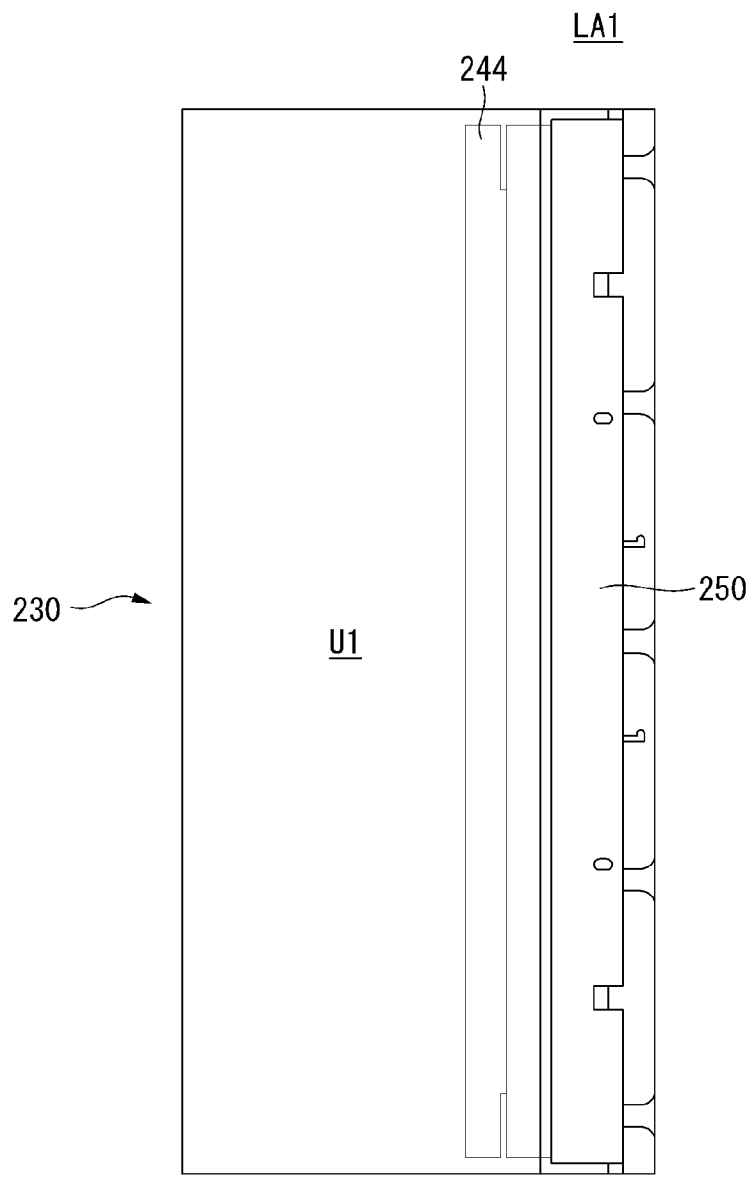
[Figure 8]

[Figure 9]
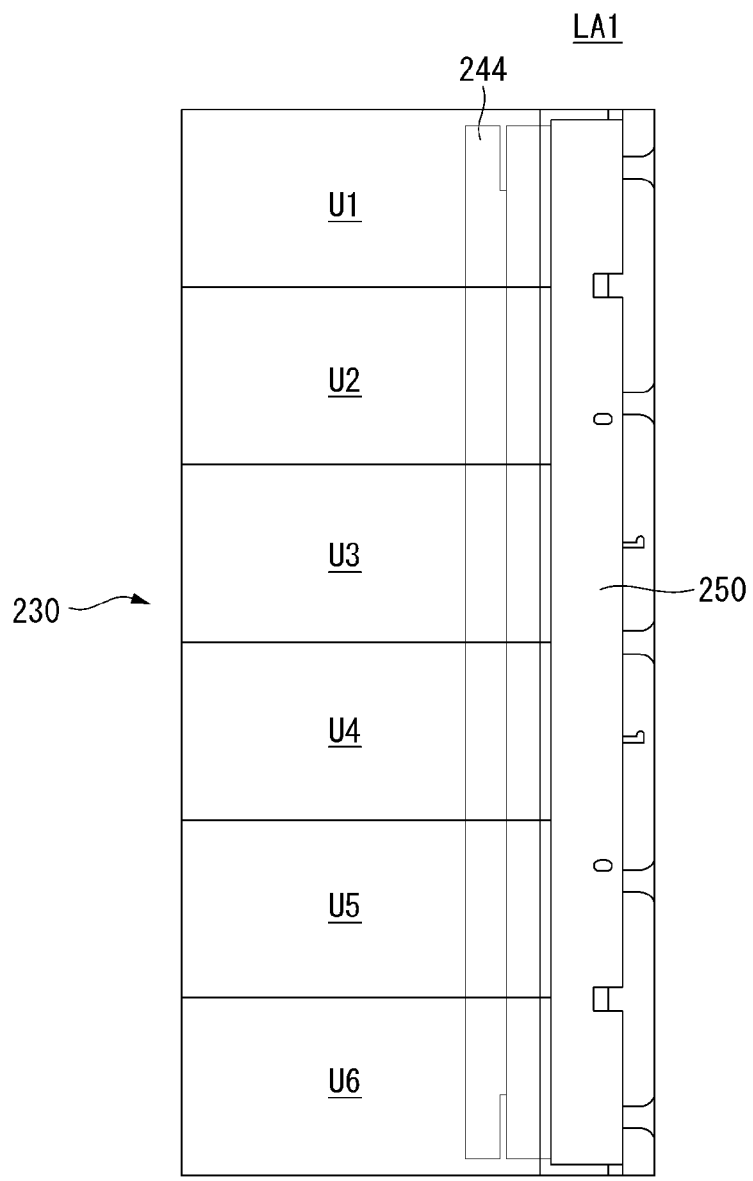

[Figure 10]
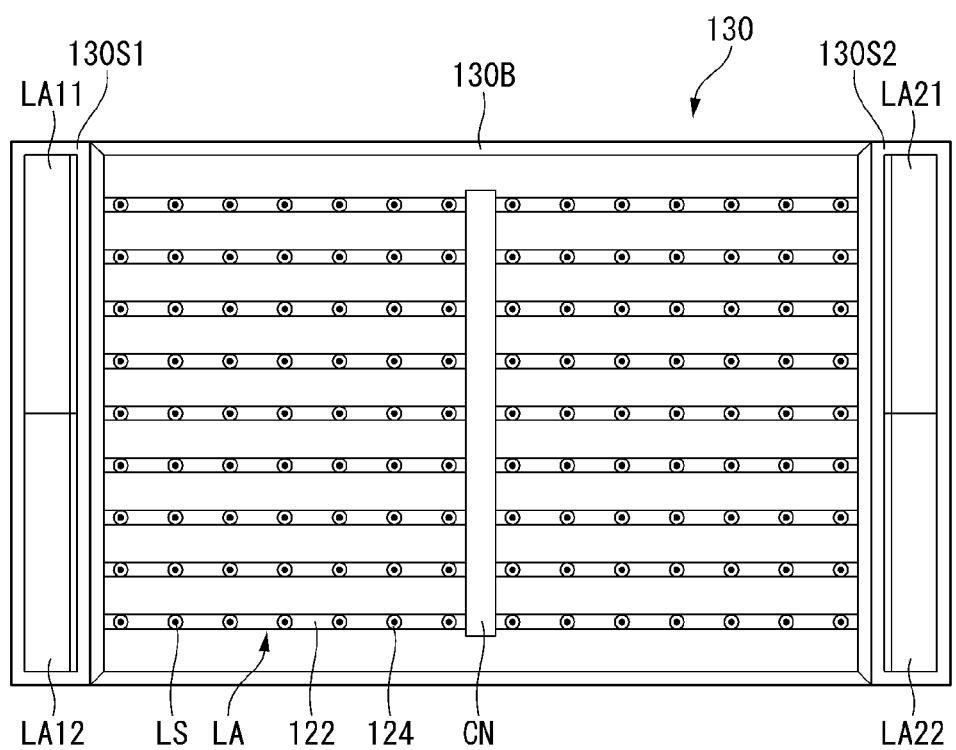

[Figure 11]
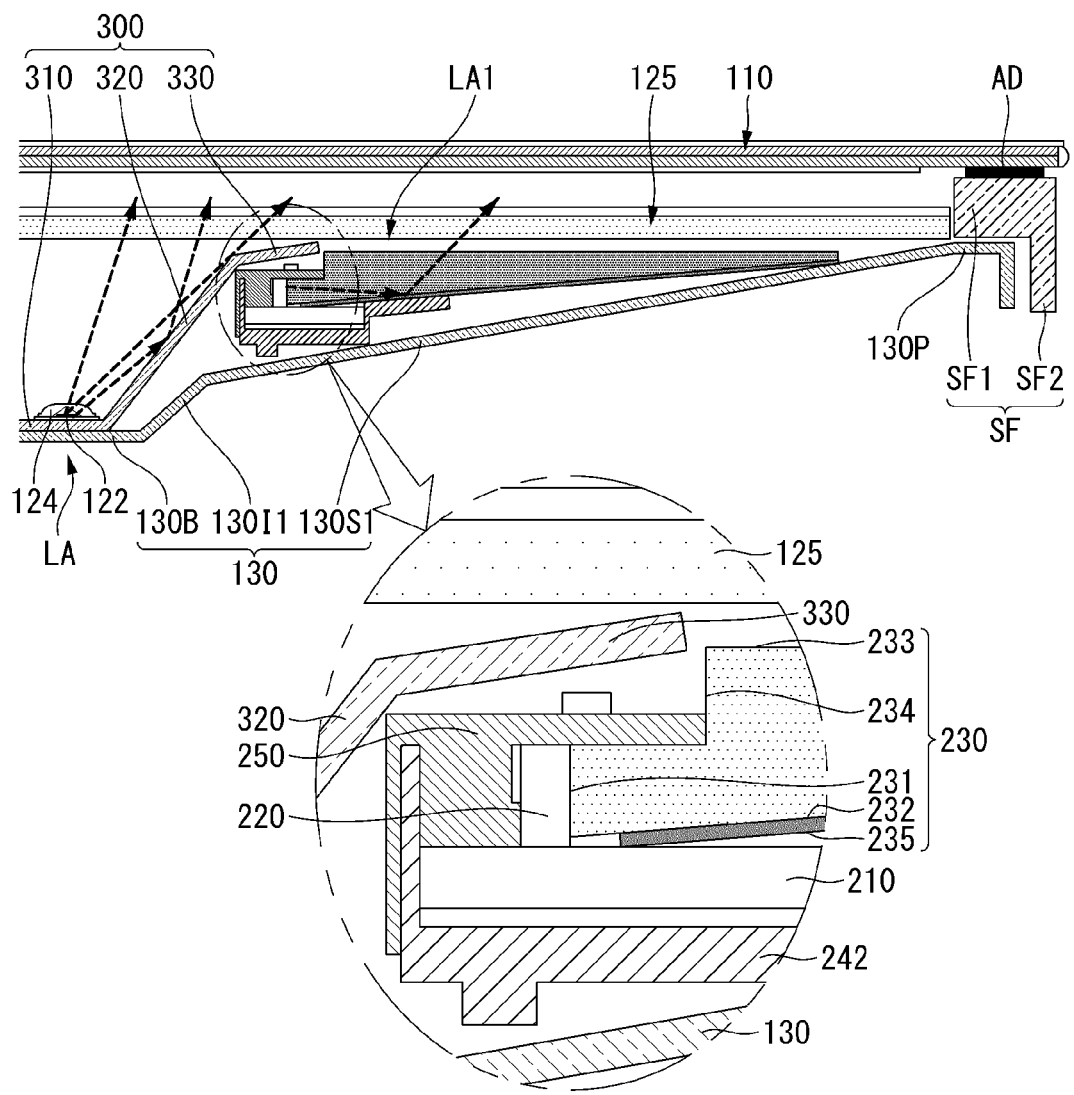

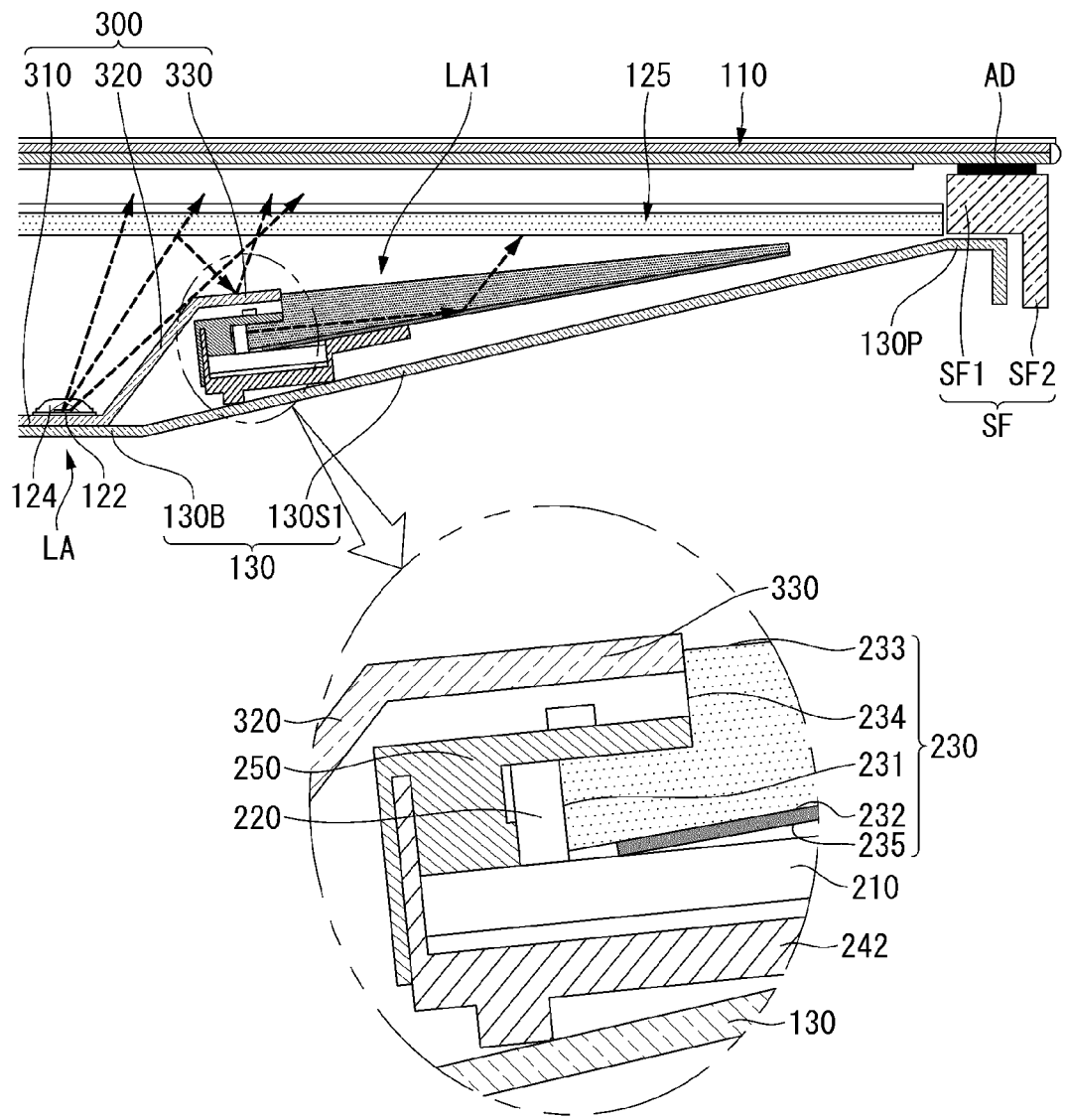

【Figure 13】
220
(a) 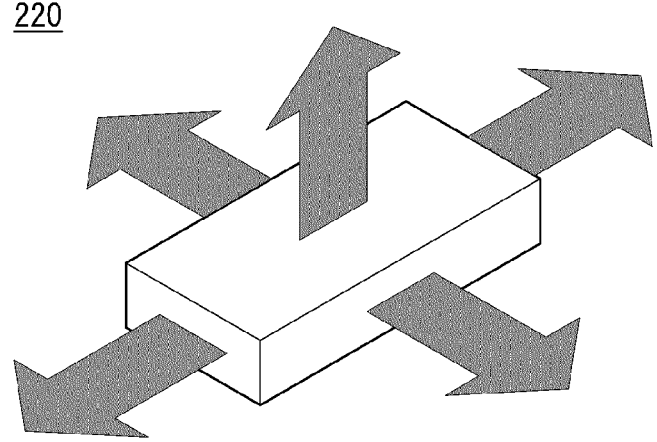
220
(b) 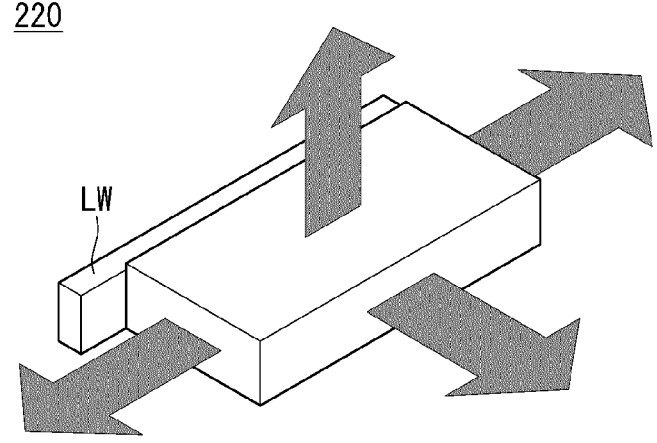

[Figure 14]
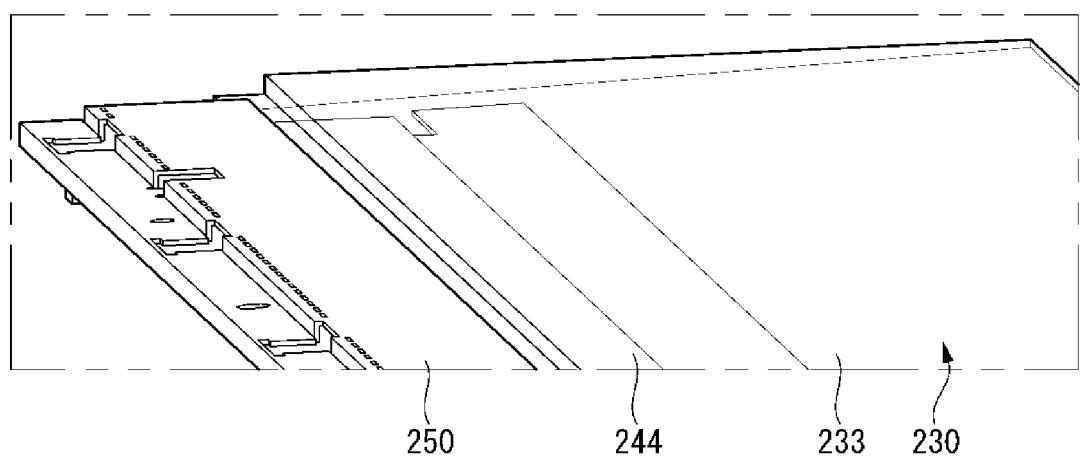

[Figure 15]
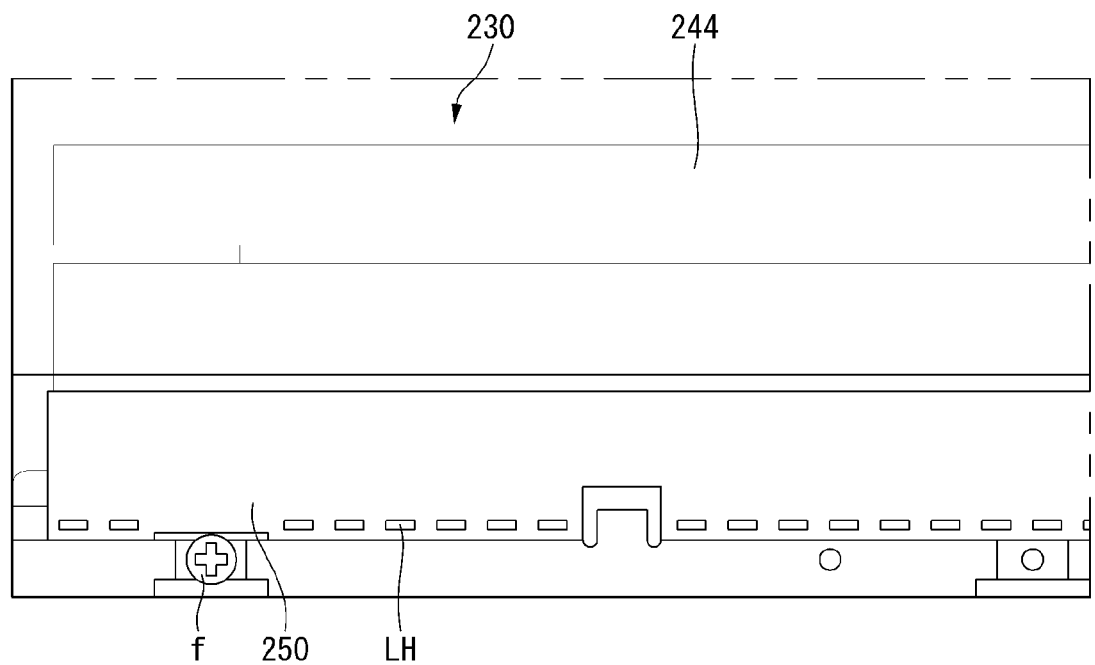

【Figure 16】
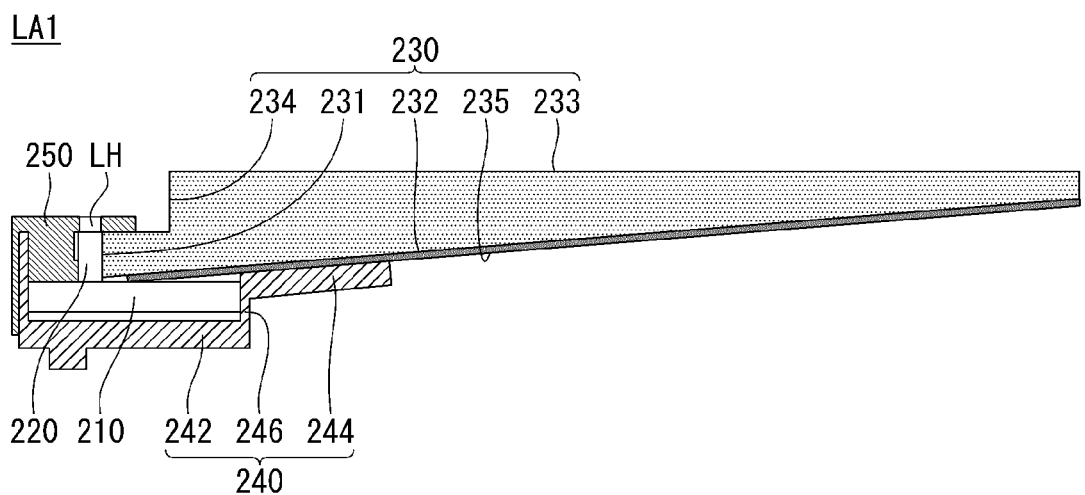

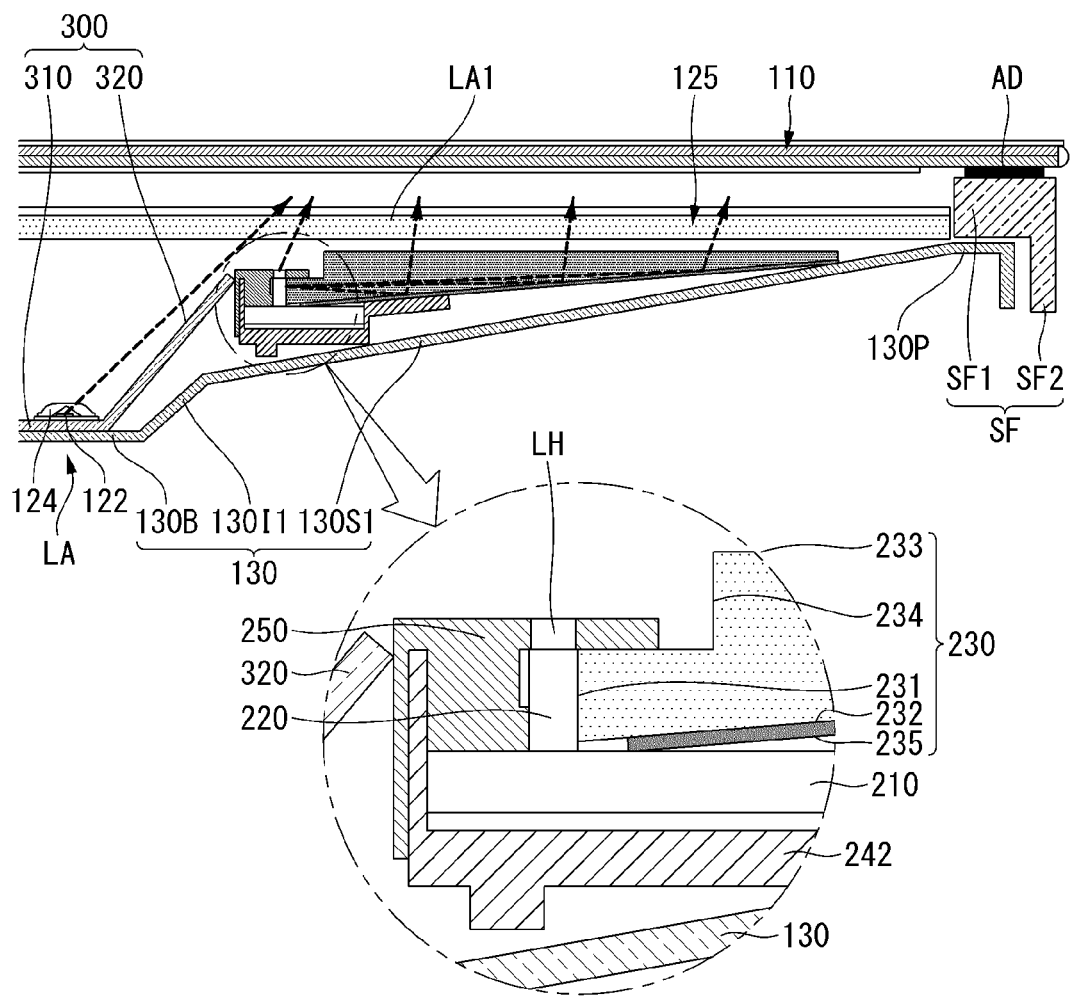

DISPLAY DEVICE

CROSS-REFERENCE TO RELATED APPLICATIONS

This application is the National Stage filing under 35 U.S.C. 371 of International Application No. PCT/KR2018/004512, filed on Apr. 18, 2018, which claims the benefit of earlier filing date and right of priority to Korean Application No. 10-2017-0100371, filed on Aug. 8, 2017, the contents of which are all hereby incorporated by reference herein in their entirety.

TECHNICAL FIELD

The present disclosure relates to a display device.

BACKGROUND ART

With the development of the information society, the demand for a display device is increased in various forms. Accordingly, various display devices, such as a liquid crystal display device (LCD), a plasma display panel (PDP), an electro luminescent display (ELD), and a vacuum fluorescent display (VFD), are recently researched and used.

From among them, the liquid crystal panel of the LCD includes a liquid crystal layer, and a TFT substrate and a color filter substrate that face each other with the liquid crystal layer interposed therebetween, and may display an image using light provided by a backlight unit.

DISCLOSURE

Technical Problem

The disclosure has been intended to solve the aforementioned problems and other problems. The disclosure is to improve the contrast ratio of a display device and also reduce consumption power of the display device.

The disclosure is to improve a light characteristic or light distribution of a display device.

The disclosure is to implement the slim structure of a display device.

Technical Solution

According to an aspect of the disclosure, there is provided a display panel, a frame positioned at the back of the display panel, a main light assembly positioned on the frame between the display panel and the frame, and a side light assembly positioned on the frame between the display panel and the frame and positioned to be adjacent to the main light assembly. The frame includes a bottom forming a lower surface and a side support extended from the bottom to one side of the display panel, the side support is closer to the display panel than the bottom, the main light assembly is positioned at the bottom, and he side light assembly is positioned at the side support.

Furthermore, according to another aspect of the disclosure, the main light assembly may include a substrate positioned on the bottom, a plurality of light sources sequentially mounted on the substrate, and a plurality of lenses mounted on the substrate and corresponding to the plurality of light sources, respectively.

Furthermore, according to another aspect of the disclosure, the side light assembly may include a light guide panel positioned between the display panel and the side support, a light source positioned adjacent to one side surface of the light guide panel, and a reflection plate positioned at the bottom of the light guide panel.

Furthermore, according to another aspect of the disclosure, the light guide panel may include a light incidence portion positioned to neighbor the light source, a light output portion forming the top of the light guide panel, and a slope portion forming the bottom of the light guide panel and having a distance closer to the light output portion as the slope portion becomes distant from the light source.

Furthermore, according to another aspect of the disclosure, the reflection plate may be bonded to the slope portion.

Furthermore, according to another aspect of the disclosure, the display device may further include a substrate on which the light source is mounted, a lower cover positioned on the lower side of the substrate, and an upper cover positioned on an upper side of the light source and coupled to the lower cover. The lower cover may include a base supporting the substrate and an extension portion extended from the base to the light guide panel and supporting the light guide panel.

Furthermore, according to another aspect of the disclosure, the upper cover may include a light hole formed at the top of the light source, and the light source may provide light toward at least the upper cover.

Furthermore, according to another aspect of the disclosure, the display device may further include a reflection sheet positioned between the main light assembly and the display panel. The reflection sheet may include a first part positioned on the bottom or the substrate, a second part extended from the first part to the side light assembly, and a third part elongated from the second part and covering a part of the side light assembly.

Furthermore, according to another aspect of the disclosure, the frame may further include a stepped portion formed between the bottom and the side support.

Furthermore, according to another aspect of the disclosure, the side support may include a first side support positioned on one side of the bottom and a second side support positioned on the other side of the bottom. The side light assembly may include a first side light assembly positioned on the first side support and a second side light assembly positioned on the second side support.

Advantageous Effects

Effects of the display device according to the disclosure are as follows.

According to at least one of embodiments of the disclosure, the contrast ratio of the display device can be improved, and consumption power of the display device can also be improved.

According to at least one of embodiments of the disclosure, a light characteristic or light distribution of the display device can be improved.

According to at least one of embodiments of the disclosure, the slim structure of the display device can be implemented.

An additional scope of the applicability of the disclosure will become evident from the following detailed description. However, various changes and modifications may be evidently understood by those skilled in the art within the spirit and scope of the disclosure. Accordingly, it is to be understood that the detailed description and a specific embodiment, such as a specific embodiment of the disclosure, are merely given as examples.

DESCRIPTION OF DRAWINGS

FIGS. 1 and 2 are diagrams illustrating an example of a display device related to the disclosure.

FIG. 3 is a diagram illustrating an example of a frame according to an embodiment of the disclosure.

FIG. 4 is a diagram illustrating an example of the deployment of a light assembly according to an embodiment of the disclosure.

FIGS. 5 to 9 are diagrams illustrating examples of light assemblies according to an embodiment of the disclosure.

FIGS. 10 to 12 are diagrams illustrating examples of a light assembly structure according to an embodiment of the disclosure.

FIGS. 13 to 17 are diagrams illustrating other examples of a light assembly according to an embodiment of the disclosure.

MODE FOR INVENTION

Hereinafter, embodiments disclosed in the disclosure are described in detail with reference to the accompanying drawings. The same or similar element is assigned the same reference numeral regardless of its reference numeral, and a redundant description thereof is omitted.

It is to be noted that the suffixes of elements used in the following description, such as a "module" and a "unit", are assigned or interchangeable with each other by taking into consideration only the ease of writing this specification, but in themselves are not particularly given distinct meanings and roles. Furthermore, in describing the embodiments disclosed in this specification, a detailed description of a related known technology will be omitted if it is deemed to make the gist of the disclosure unnecessarily vague. Furthermore, the accompanying drawings are merely intended to make easily understood the exemplary embodiments disclosed in this specification, and the technical spirit disclosed in this specification is not restricted by the accompanying drawings and includes all modifications, equivalents, and substitutions which fall within the spirit and technological scope of the disclosure.

Hereinafter, a display panel is described by taking a liquid crystal display device (LCD) as an example, but the display panel capable of being applied to the disclosure is not limited to the LCD and may be applied to a plasma display panel (PDP), a field emission display (FED), and an organic light emitting diode (OLED).

FIGS. 1 and 2 are diagrams illustrating an example of a display device related to the disclosure.

Hereinafter, the display device 100 may include a first long side LS1, a second long side LS2 opposite the first long side LS1, a first short side SS1 neighboring the first long side LS1 and the second long side LS2, and a second short side SS2 opposite the first short side SS1.

In this case, the area of the first short side SS1 may be called a first side area. The area of the second short side SS2 may be called a second side area opposite the first side area. The area of the first long side LS1 may be called a third side area neighboring the first side area and the second side area and positioned between the first side area and the second side area. The area of the second long side LS2 may be called a fourth side area neighboring the first side area and the second side area, positioned between the first side area and the second side area, and opposite the third side area.

Furthermore, for convenience of description, the length of the first or second long side LS1, LS2 has been illustrated as being longer than the length of the first, second short side SS1, SS2, but the length of the first, second long side LS1, LS2 may be approximately the same as that of the first, second short side SS1, SS2.

Furthermore, hereinafter, a first direction DR1 may be a direction parallel to the long side LS1, LS2 of the display device 100. A second direction DR2 may be a direction parallel to the short side SS1, SS2 of the display device 100. A third direction DR3 may be a direction perpendicular to the first direction DR1 and/or the second direction DR2.

The first direction DR1 and the second direction DR2 may be collectively called a horizontal direction. Furthermore, the third direction DR3 may be called a vertical direction.

From a different viewpoint, the side on which the display device 100 displays an image may be called a front or front surface. When the display device 100 displays an image, the side on which the image cannot be viewed may be called a rear or rear surface. When the display device 100 is viewed from the front or front surface, the side of the first long side LS1 may be called a top or top surface. Likewise, the side of the second long side LS2 may be called a bottom or bottom surface. Likewise, the side of the second short side SS2 may be called the left side or a left surface, and the first short side SS1 may be called the right side or a right surface.

Furthermore, the first long side LS1, the second long side LS2, the first short side SS1, and the second short side SS2 may be called the edges of the display device 100. Furthermore, points where the first long side LS1, the second long side LS2, the first short side SS1, and the second short side SS2 meet may be called corners. For example, the point where the first long side LS1 and the first short side SS1 meet may be called a first corner $C_1$, the point where the first long side LS1 and the second short side SS2 meet may be called a second corner $C_2$, the point where the second short side SS2 and the second long side LS2 meet may be called a third corner $C_3$, and the point where the second long side LS2 and the first short side SS1 meet may be called a fourth corner $C_4$.

In this case, a direction from the first short side SS1 to the second short side SS1 or a direction from the second short side SS2 to the first short side SS1 may be called a left and right LR. A direction from the first long side LS1 to the second long side LS2 or a direction from the second long side LS2 to the first long side LS1 may be called an up and down UD.

A front cover 105 may cover at least some of the front and side of the display panel 110. The front cover 105 may have a quadrangular frame shape having an empty center.

The front cover 105 may include a front surface cover and a side cover. That is, the front cover may be divided into the front surface cover positioned on the front side of the display panel 110 and the side cover positioned on the side of the display panel 110. The front surface cover and the side cover may be separately configured. Any one of the front surface cover and the side cover may be omitted.

A display panel 110 is provided at the front of the display device 100, and an image may be displayed on the display panel. The display panel 110 may divide an image into a plurality of pixels and output the image in accordance with a color, brightness, and chroma per pixel. The display panel 110 may be divided into an active area in which an image is displayed and an inactive area in which an image is not displayed. The display panel 110 may include a front substrate and a rear substrate opposite each other with a liquid crystal layer interposed therebetween.

The front substrate may include a plurality of pixels configured with red (R), green (G) and blue (B) subpixels. The rear substrate may include switching elements. The rear substrate may switch a pixel electrode. For example, the pixel electrode may change the array of the molecules of the liquid crystal layer in response to an external control signal. The liquid crystal layer may include a plurality of liquid crystal molecules. The array of the liquid crystal molecules may be changed in accordance with a voltage difference generated between the pixel electrode and a common electrode. The liquid crystal layer may block or transmit, toward the front substrate, light provided by a backlight unit 120.

The backlight unit 120 may be positioned at the back of the display panel 110. The backlight unit 120 may include a plurality of light sources. The light sources of the backlight unit 120 may have a direct type or an edge type. The edge type backlight unit 120 may further include a light guide panel.

The backlight unit 120 may be driven using a full driving method or a partial driving method, such as local dimming or impulsive. The backlight unit 120 may include an optical sheet 125 and an optical layer 123.

The optical sheet 125 may uniformly transmit, to the display panel 110, light provided by a light source. The optical sheet 125 may be configured with a plurality of layers. For example, the optical sheet 125 may include at least one prism sheet and/or at least one diffusion sheet.

The optical sheet 125 may include at least one coupling part 125d. The coupling part 125d may be coupled to the front cover 105 and/or a back cover 150. Alternatively, the coupling part 125d may be coupled to a structure mounted on the front cover 105 and/or the back cover 150.

The optical layer 123 may include the light source, etc. A detailed element of the optical layer 123 is described in a corresponding part.

A frame 130 may function to support the elements of the display device 100. For example, an element, such as the backlight unit 120, may be coupled to the frame 130. The frame 130 may be made of a metal material, such as an aluminum alloy, and may provide stiffness to the display device 100.

The back cover 150 may be positioned at the back of the frame 130. The back cover 150 can protect internal elements against the outside. At least some of the back cover 150 may be coupled to the frame 130 and/or the front cover 105. The back cover 150 may be an injected matter of a resin material.

Referring to FIG. 3, the frame 130 may include a bottom 130B and side supports 130S1 and 130S2. The bottom 130B may be a flat plate. The side supports 130S1 and 130S2 may be positioned on one side or both sides of the bottom 130B, and may be positioned over the bottom 130B. For example, the bottom 130B and the side supports 130S1 and 130S2 may form a step. The frame 130 may have stepped portions $130I_1$ and $130I_2$. The stepped portions $130I_1$ and $130I_2$ may be extended from the bottom 130B to the side supports 130S1 and 130S2. For example, each of the stepped portions $130I_1$ and $130I_2$ may have a slope.

A distance D1 from the display panel 110 to the bottom 130B may be greater than a distance DS1 or DS2 from the display panel 110 to the side support 130S1 or 130S2. The distance DS1 from the display panel 110 to the first side support 130S1 may be the same as the distance DS2 from the display panel 110 to the second side support 130S2. The distances D1, DS2, and DS3 may be called optical distances.

Referring to FIG. 4, a main light assembly LA may be positioned on the bottom 130B. A first light assembly LA1 may be positioned on the first side support 130S1. A second light assembly LA2 may be positioned on the second side support 130S2. The first light assembly LA1 and/or the second light assembly LA2 may be different from the main light assembly LA. The first light assembly LA1 may be the same as the second light assembly LA2.

The main light assembly LA may include a substrate 122 and a plurality of lenses 124. The substrate 122 may be lengthily elongated to the left and right of the bottom 130B. A plurality of light sources LS may be sequentially mounted on the substrate 122. The plurality of lenses 124 may be mounted on the substrate 122 in accordance with the plurality of light sources LS, respectively. A plurality of the substrates 122 may be sequentially arranged in the up and down direction of the bottom 130B.

Referring to FIG. 5, a housing 1223 may be mounted on a substrate 1220. A light source 1224 may be received in or mounted on the housing 1223. The light source 1224 may provide light from the housing 1223 to the lateral direction of the housing 1223. A reflection sheet 1221 may be positioned on the substrate 1220. A reflection pattern 1222 may be formed on the reflection sheet 1221.

A resin layer 1226 may be formed over the substrate 1220 in such a way as to cover the reflection sheet 1221 and/or the reflection pattern 1222 and/or the housing 1223. The resin layer 1226 may be a transparent substance. The resin layer 1226 may fully cover the housing 1223. The reflection pattern 1222 may be formed on the top or top surface of the resin layer 1226. Accordingly, light LP provided from the light source 1224 to the side of the housing 1223 may be reflected and/or scattered and uniformly spread to the entire resin layer 1226. The aforementioned contents may be an example of a first light assembly or a second light assembly.

Referring to FIG. 6, a light source 1224 may be mounted on a housing 1223. The housing 1223 may be mounted on the substrate 122. A reflection sheet 1221 may be positioned on the substrate 122. The reflection sheet 1221 may partially overlap the substrate 122 in order to be adjacent to the light source 1224 or the housing 1223. An optical sheet 1228 may be positioned over the reflection sheet 1221 and/or the light source 1224 and/or the substrate 122, and may be spaced apart therefrom. That is, an empty space AG may be formed between the optical sheet 1228 and the reflection sheet 1221. The optical sheet 1228 may be spaced apart from the reflection sheet 1221 by a support 1227.

The optical sheet 1228 may include a plurality of holes h. The plurality of holes h may be formed to penetrate the optical sheet 1228. The size of a second hole h12 may be greater than the size of a first hole h11. The size of a third hole h13 may be greater than the size of the second hole h12. That is, the sizes of the plurality of holes h may be greater as the plurality of holes becomes distant in a horizontal direction from the light source 1224. Accordingly, a light distribution may be uniform regardless of the light source 1224.

The optical sheet 1228 may include a reflection surface RF. The reflection surface RF may be formed on the bottom of the optical sheet 1228. Accordingly, light may be reflected and/or scattered between the reflection sheet 1221 and the optical sheet 1228. The reflected and/or scattered light may be externally output through the plurality of holes h. The aforementioned contents may be an example of the first light assembly LA1 or a second light assembly LA2.

Referring to FIGS. 7 and 8, a light source 220 may be mounted on a substrate 210. For example, the substrate 210 may be a PCB. The light source 220 may be electrically connected to the substrate 210. The light source 220 may provide light in the lateral direction of the substrate 210. This may be called a side view type. A light guide panel 230 may be positioned over the substrate 210. The light source 220 may be positioned on one side of the light guide panel 230.

The light guide panel 230 may include an introduction part 231, a slope portion 232, and a light output portion 233. The introduction part 231 may form one side of the light guide panel 230. The introduction part 231 may neighbor the light source 220 or come into contact with the light source 220. The slope portion 232 may form the lower surface of the light guide panel 230. The slope portion 232 may have a positive slope with respect to the center of the light source 220. This may mean that the slope portion 232 may have an ascent slope as it becomes distant from the light source 220. The light output portion 233 may form the upper surface of the light guide panel 230. The light output portion 233 may face the slope portion 232. A stepped portion 234 may be formed between the introduction part 231 and the light output portion 233. The introduction part 231 may be called a light incidence portion 231.

A lower cover 240 may be positioned on the lower side of the substrate 210 and/or under the light guide panel 230. The lower cover 240 may receive the substrate 210 and the light source 220 and support the light guide panel 230. The lower cover 240 may include a base 242. The base 242 may be a lengthily elongated flat panel. The lower cover 240 may include an extension portion 244. The extension portion 244 may be extended from the light source 220 to a direction toward the light guide panel 230. The base 242 and the extension portion 244 may form a step 246. An upper cover 250 may be coupled to the lower cover 240. The upper cover 250 may press the light guide panel 230 from the upper side. The upper cover 250 may cover the top of the light source 220. For example, the upper cover 250 and the lower cover 240 may be metal.

A reflection plate 235 may be positioned at the bottom of the light guide panel 230 or may come into contact with the bottom of the light guide panel 230 or may be formed on the bottom of the light guide panel 230. For example, the reflection plate 235 may be a reflection sheet or may be a coated reflection material.

The aforementioned contents may be an example of the first light assembly LA1 or the second light assembly LA2.

Referring to FIG. 9, the light guide panel 230 may be a plural number. The plurality of light guide panels 230 may be sequentially arranged. For example, a first light guide panel U1 may be positioned on one side, a second light guide panel U2 may neighbor the first light guide panel U1, a third light guide panel U3 may neighbor the second light guide panel U2, a fourth light guide panel U4 may neighbor the third light guide panel U3, a fifth light guide panel U5 may neighbor the fourth light guide panel U4, and a sixth light guide panel U6 may neighbor the fifth light guide panel U5. A single or a plurality of the light sources 220 (refer to FIG. 7) may be arranged in accordance with the light guide panels U1~U6. Accordingly, the amount of light can be locally adjusted.

The aforementioned contents may be an example of the first light assembly LA1 or the second light assembly LA2. The first light assembly LA1 and/or the second light assembly LA2 may be called a side light assembly.

Referring to FIG. 10, the main light assembly LA may be positioned on the bottom 130B of the frame 130. The side light assemblies LA1 and LA2 may include an eleventh light assembly LA11, a twelfth light assembly LA12, a twenty-first light assembly LA21, and a twenty-second light assembly LA22. The eleventh light assembly LA11 and/or the twelfth light assembly LA12 may be positioned on the first side support 130S1. The twenty-first light assembly LA21 and/or the twenty-second light assembly LA22 may be positioned on the second side support 130S2.

A connector CN may be electrically connected to a plurality of the substrates 122. Externally supplied power may be provided to the light sources LS provided in the main light assembly LA through the plurality of substrates 122.

Referring to FIG. 11, the frame 130 may include a flange 130P. The flange 130P may be formed at one end of the side support 130S1. The flange 130P may support a side frame SF. The optical sheet 125 may be supported by the flange 130P, and may be positioned under the display panel 110.

The side frame SF may include a horizontal portion SF1 and a vertical portion SF2. The vertical portion SF2 may form an external appearance of the display device. An adhesion member AD may be fixed on the horizontal portion SF1, and the display panel 110 may be fixed to the adhesion member AD. For example, the adhesion member AD may be a double-sided tape.

A reflection sheet 300 may include a first part 310, a second part 320, and a third part 330. The first part 310 may be positioned on the bottom 130B of the frame 130. The first part 310 may include a hole (not illustrated) through which the lens 124 passes. The second part 320 may be extended from the first part 310 to the side light assembly LA1. The second part 320 may face the stepped portion 130I1.

The third part 330 may be positioned on the side light assembly LA1. The third part 330 may be fixed on the upper cover 250 of the side light assembly LA1. One end of the third part 330 may be adjacent to the side of the stepped portion 234 of the light guide panel 230 or may come into contact with the side of the stepped portion 234 of the light guide panel 230. The third part 330 may be coupled to the second part 320. Accordingly, a dark area which may be formed between the main light assembly LA and the side light assembly LA1 can be improved, and a light distribution provided to the display panel 110 can be uniform.

Referring to FIG. 12, the side support 130S1 may be extended from the bottom 130B to the flange 130P. The side support 130S1 may have a gentle slope from the bottom 130S to the flange 130P. The side light assembly LA1 may be positioned over the side support 130S1. Accordingly, a dark area which may be formed between the main light assembly LA and the side light assembly LA1 can be improved, and a light distribution provided to the display panel 110 can become more uniform.

Referring to FIG. 13, the light source 220 may have many-sided light. Referring to FIG. 13(a), the light source 220 may be an LED capable of 5-sided light emission. Referring to FIG. 13(b), the light source 220 may be an LED capable of 4-sided light emission. A wall LW may cover one side of the light source 220.

Referring to FIGS. 14 and 15, the upper cover 250 may be a plate lengthily elongated in the length direction of one side of the light guide panel 230. The upper cover 250 may be coupled to the lower cover 240 (refer to FIG. 7) by a fastening member f. The upper cover 250 may include a light hole LH. A plurality of the light holes LH may be formed in the upper cover 250. The light hole LH may be positioned at the top of the light source 220 (refer to FIG. 7). The number of light holes LH may correspond to the number of light sources 220 (refer to FIG. 7).

Referring to FIGS. 16 and 17, light emitted from the light source 220 to the light guide panel 230 may pass through the introduction part 231, may be reflected within the light guide panel 230, and may be spread to the entire light guide panel 230. Accordingly, the light guide panel 230 can uniformly provide light to the display panel 110. Light provided from the light source 220 to the upper side of the light source 220 may be provided to the display panel 110 through the light hole LH of the upper cover 250. Accordingly, light having a distribution identical with or similar to that of the main light assembly LA and the side light assembly LA1 can be provided between the main light assembly LA and the side light assembly LA1.

Any or others of the aforementioned embodiments of the disclosure should not be understood to be exclusive or different. In any or others of the aforementioned embodiments of the disclosure, the elements or functions may be interchangeably used or used in combination.

The detailed description should not be construed as being limited, but should be considered to be illustrative from all aspects. The scope of the disclosure should be determined by reasonable analysis of the attached claims, and all changes within the equivalent scope of the disclosure are included in the scope of the disclosure.

The invention claimed is:

1. A display device, comprising:
a display panel;
a frame positioned at a back of the display panel;
a main light assembly positioned on the frame between the display panel and the frame; and
a side light assembly positioned on the frame between the display panel and the frame and positioned to be adjacent to the main light assembly,
wherein the frame comprises a bottom forming a lower surface and a side support extended from the bottom to one side of the display panel,
wherein the side support is closer to the display panel than the bottom,
wherein the main light assembly is positioned at the bottom,
wherein the side light assembly is positioned at the side support, and
wherein the side light assembly comprises:
a light guide panel positioned between the display panel and the side support;
a light source positioned adjacent to one side surface of the light guide panel; and
a reflection plate positioned at a bottom of the light guide panel.

2. The display device of claim 1,
wherein the main light assembly comprises:
a substrate positioned on the bottom;
a plurality of light sources sequentially mounted on the substrate; and
a plurality of lenses mounted on the substrate and corresponding to the plurality of light sources, respectively.

3. The display device of claim 1,
wherein the side support comprises:
a first side support positioned on one side of the bottom; and
a second side support positioned on the other side of the bottom,
wherein the side light assembly comprises:

a first side light assembly positioned on the first side support; and
a second side light assembly positioned on the second side support.

4. The display device of claim 1,
wherein the light guide panel comprises:
a light incidence portion positioned to neighbor the light source;
a light output portion forming a top of the light guide panel; and
a slope portion forming a bottom of the light guide panel and having a distance closer to the light output portion as the slope portion becomes distant from the light source.

5. The display device of claim 4, wherein the reflection plate is bonded to the slope portion.

6. The display device of claim 4, further comprising:
a substrate on which the light source is mounted;
a lower cover positioned on a lower side of the substrate; and
an upper cover positioned on an upper side of the light source and coupled to the lower cover,
wherein the lower cover comprises:
a base supporting the substrate; and
an extension portion extended from the base to the light guide panel and supporting the light guide panel.

7. The display device of claim 6,
wherein the upper cover comprises a light hole formed at a top of the light source, and
wherein the light source provides light toward at least the upper cover.

8. The display device of claim 2, further comprising:
a reflection sheet positioned between the main light assembly and the display panel,
wherein the reflection sheet comprises:
a first part positioned on the bottom or the substrate;
a second part extended from the first part to the side light assembly; and
a third part elongated from the second part and covering a part of the side light assembly.

9. A display device comprising:
a display panel;
a frame positioned at a back of the display panel;
a main light assembly positioned on the frame between the display panel and the frame; and
a side light assembly positioned on the frame between the display panel and the frame and positioned to be adjacent to the main light assembly,
wherein the frame comprises a bottom forming a lower surface and a side support extended from the bottom to one side of the display panel,
wherein the side support is closer to the display panel than the bottom,
wherein the main light assembly is positioned at the bottom, wherein the side light assembly is positioned at the side support, and,
wherein the frame further comprises a stepped portion formed between the bottom and the side support.

* * * * *